United States Patent
Larmuseau

(10) Patent No.: US 11,658,827 B2
(45) Date of Patent: May 23, 2023

(54) SELECTIVE DISCLOSURE OF ATTRIBUTES AND DATA ENTRIES OF A RECORD

(71) Applicant: KONINKLIJKE PHILIPS N.V., Eindhoven (NL)

(72) Inventor: Adriaan Joris H. Larmuseau, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 334 days.

(21) Appl. No.: 16/913,641

(22) Filed: Jun. 26, 2020

(65) Prior Publication Data
US 2020/0412546 A1 Dec. 31, 2020

(30) Foreign Application Priority Data
Jun. 27, 2019 (EP) ..................................... 19182989

(51) Int. Cl.
*H04L 9/32* (2006.01)
*G06F 16/23* (2019.01)
*H04L 9/30* (2006.01)

(52) U.S. Cl.
CPC ........ *H04L 9/3247* (2013.01); *G06F 16/2379* (2019.01); *H04L 9/30* (2013.01); *H04L 9/3218* (2013.01); *H04L 9/3231* (2013.01)

(58) Field of Classification Search
None
See application file for complete search history.

(56) References Cited

U.S. PATENT DOCUMENTS

2003/0159070 A1   8/2003  Mayer et al.
2009/0094464 A1*  4/2009  Futa ...................... H04L 9/3252
                                                                    713/189
(Continued)

FOREIGN PATENT DOCUMENTS

EP       2336933 A2 *  6/2011  ........... G06F 19/322
JP    2002278449     *  9/2002
(Continued)

OTHER PUBLICATIONS

Wang, Cong et al. "Privacy-Preserving Public Auditing for Secure Cloud Storage" [online] IACR, Dec. 2011 [retrieved Jul. 16, 2022]. Retrieved from the Internet: URL: https://eprint.iacr.org/2009/579.pdf (Year: 2011).*

(Continued)

*Primary Examiner* — Linglan Edwards
*Assistant Examiner* — Joshua Raymond White

(57) ABSTRACT

Some embodiments are directed to a system for selectively disclosing attributes and data entries of a record. An issuer device generates a digital signature on a message comprising the attributes and a secret record identifier, and digital signatures on messages comprising respective data entries and each comprising the secret record identifier. The record, secret record identifier, and signatures are provided to a selector device. The selector device selectively discloses attributes and data entries of the record to a receiver device, proving authenticity by means of a zero-knowledge proof of knowledge of the signature on the attributes and signatures on respective data entries. The receiver device verifies the proof with respect to the public key of the issuer and the received attributes and data entries.

13 Claims, 6 Drawing Sheets

(56) References Cited

U.S. PATENT DOCUMENTS

| | | | |
|---|---|---|---|
| 2010/0034376 A1 | 2/2010 | Okuizumi et al. | |
| 2010/0115281 A1 | 5/2010 | Camenish et al. | |
| 2011/0202764 A1* | 8/2011 | Furukawa | H04L 9/0844 |
| | | | 713/167 |
| 2012/0005098 A1* | 1/2012 | Gross | G06F 21/31 |
| | | | 705/50 |
| 2014/0237253 A1 | 8/2014 | Joye et al. | |
| 2015/0271197 A1 | 9/2015 | Field et al. | |

FOREIGN PATENT DOCUMENTS

| | | | |
|---|---|---|---|
| JP | 2003338816 | * | 11/2003 |
| JP | 2003338816 A | | 11/2003 |
| JP | 2004029902 A | | 1/2004 |
| JP | 2004185192 A | | 7/2004 |
| JP | 2006163932 A | | 6/2006 |
| WO | 2007043199 A1 | | 4/2007 |
| WO | 2008069011 A1 | | 3/2010 |

OTHER PUBLICATIONS

European Search Report for European Application No. EP19182989. 4, filed Jun. 27, 2019, 2 pages.

Maffei, et al., "Privacy and Access Control for Outsourced Personal Records", 2015 IEEE Symposium on Security and Privacy, pp. 341-358.

Camenisch, et al., "Efficient Attributes for Anonymous Credentials", ACM Transactions on Information and System Security, vol. 15, No. 1, pp. 345-356.

Camenisch, et al., "An Accumulator Based on Bilinear Maps and Efficient Revocation for Anonymous Credentials", International Workshop on Public Key Cryptology, PKC 2009, pp. 481-500.

Boneh, et al., "Short Signatures Without Random Oracles and the SDH Assumption in Bilinear Groups", Journal of Cryptology, 21(2), 28 pages.

Camenisch, et al., "Signature Schemes and Anonymous Credentials from Bilinear Maps", Annual International Cryptology Conference, CRYPTO 2004, pp. 56-72.

* cited by examiner

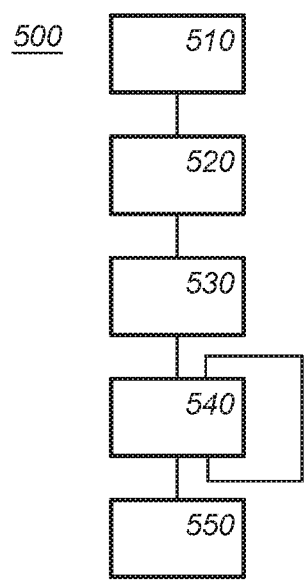
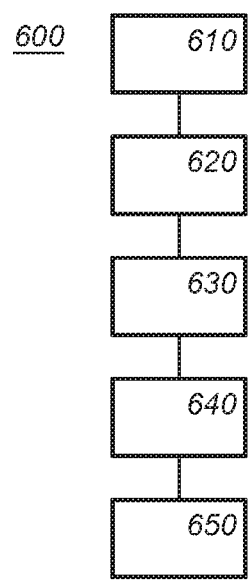
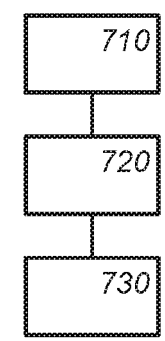
Fig. 5
Fig. 6
Fig. 7
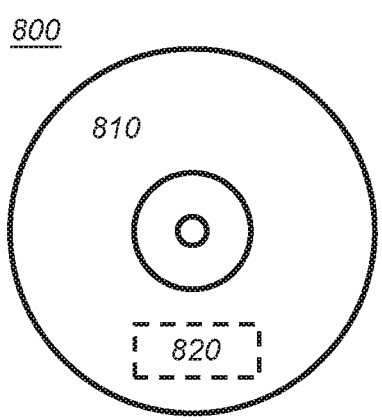
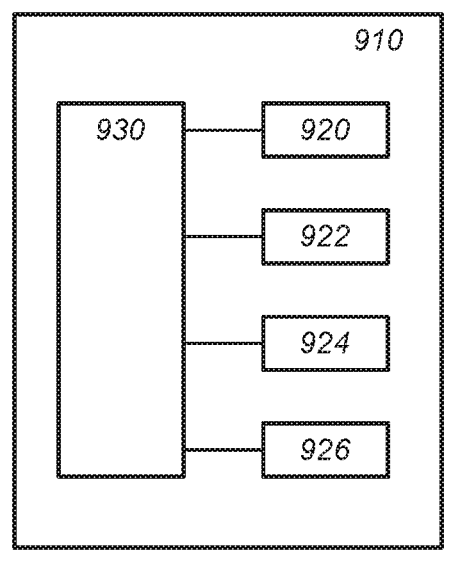
Fig. 8
Fig. 9

SELECTIVE DISCLOSURE OF ATTRIBUTES AND DATA ENTRIES OF A RECORD

RELATED APPLICATION

This application claims the benefit of and priority to European Application No. 19182989.4, filed Jun. 27, 2019. These applications are hereby incorporated by reference in their entirety.

FIELD OF THE INVENTION

The invention relates to a system for selectively disclosing attributes, e.g., phenotype attributes, and data entries, e.g., portions of genomic data, of a record. The invention also relates to an issuer device, a selector device, and a receiver device for use in such a system. The invention further relates to an issuer method, a selector method, and a receiver method corresponding to the respective devices. The invention also relates to a computer readable storage medium.

BACKGROUND OF THE INVENTION

The use of genomic data for medical research and treatment holds great promise in terms of possible applications, but if not dealt with carefully, also carries great risks in terms of data privacy and security. As genomic data of more and more people is becoming available, the scope for doing medical research, e.g., to find better or more tailored treatment is increasing. At the same time, such medical research involves highly sensitive genotype and phenotype data, and in many cases, for example, in genome-wide association studies, data about many different patients may be used. Hence, appropriate measures need to be taken to prevent unauthorized access and modification to such data.

A known way to limit data exposure in a medical research setting is de-identification. For example, in a known system, genomic data may be collected from several originating parties, e.g., data from various devices or medical trials, and stored at a central platform. A researcher may request genomic data of patients with certain characteristics. Following laws and global standards, such data should be de-identified. Accordingly, the platform may select data about one or more patients; de-identify the data, e.g., select a subset of phenotype and genotype data; and provide the de-identified data to the researcher.

More generally, de-identification, e.g., providing a redacted version of a record of personal information which sufficiently limited in its specificity and details so that it can no longer be linked to its data subject, is becoming more and more common, driven by legislative pushes such as the GDPR as well as medical standards such as GA4GH Beacon. For example, de-identified data may be used for medical research other than genomic research, but also in various other application areas such as financial services and advertising. For records more generally, e.g., not containing personal information, de-identification may be regarded as a type of selective disclosure, e.g., letting a data provider decide which parts of a record to share with a recipient.

From the point of view of the recipient of the de-identified data, e.g., the researcher receiving de-identified genomic and phenotype data about a patient, the fact that the data is de-identified may introduce risks of fraud or manipulation by bad actors. Because de-identified data may not be linkable to its original source, it can be difficult to discern between real data, that has a legitimate source, and fake data, that has no legitimate source. Accordingly, it is desirable to perform de-identification in such a way that the recipient, e.g. somebody paying for the data or somebody inspecting the data for regulatory purposes, can trust that the de-identified data is legitimate, e.g., originating from trustworthy sources.

SUMMARY OF THE INVENTION

Ensuring authenticity may be performed using conventional techniques, for example by sending a request to all of the originators of the data to digitally sign off on the de-identified data, proving that they approve of it. However, this is cumbersome, often expensive and may not even be possible, e.g., if the originator is an organization or machine that has been decommissioned. Accordingly, there is a need for better automated techniques to ensure trustworthiness of selectively disclosed records.

In order to address these and other problems, a system for selectively disclosing attributes and data entries of a record is proposed as defined by the claims. The system may comprise an issuer device for providing a record to a selector device for selective disclosure; a selector device for selectively disclosing parts of the record to a receiver device; and a receiver device for selectively obtaining the parts of the record.

The record may comprise two different types of data, namely, the record may comprise one or more attributes and multiple data entries. In a selective disclosure, the selector device may determine one or more attributes to be disclosed as a subset of the one or more attributes, and one or more data entries to be disclosed as a subset of the multiple data entries. The record may be a personal information record, e.g. the attributes and data entries may comprise information about a person. However, records comprising other types of sensitive information are equally well possible.

The attributes are typically from a predefined set, e.g., if multiple records are processed by the system, each record may provide values for the same set of attributes. For example, one or more records may represent phenotype information about a person, e.g., length, hair colour, diagnosis of a particular medical condition, etc. The values for the attributes in a particular record are typically fixed throughout the lifetime of a record. Attributes are typically numeric, categorical, strings of fixed length, etcetera. The number of attributes is also relatively small, e.g., at most 10, at most 20, or at most 50.

On the other hand, data entries may be used for different kinds of information than attributes. For example, a data entry may represent a genome portion of the person that the record represents, e.g., a single nucleotide polymorphism (SNP), e.g., as encoded by a data line of a Variant Call Format (VCF) file of genomic data. The number of data entries associated with a record is typically larger than the number of attributes, e.g., at least 100, at least 500, or at least 1000 data entries may be associated with a record. Data entries are also typically not numeric or categorical, e.g., they can be strings, e.g., of flexible length, or binary data, e.g., an image. Also, the number of data entries associated with a record need not be fixed, e.g., different records can have different numbers of data entries associated to them. The set of data entries may even be dynamic, e.g., new data entries may be added to a record as they become available, existing data entries may be removed or updated, etc. These characteristics make it impractical to handle data entries in the same way that attributes are handled.

To still enable selective disclosure of both attributes and data entries in a secure way, the inventors have devised for the issuer device to generate digital signatures on the attributes and the data entries, using an issuer private key of which the corresponding issuer public key is known to the receiver device. As is known, a digital signature on a message allows somebody with the issuer public key to establish that the message has been signed by a party holding the corresponding private key. In this case, the issuer device may generate a digital signature on an attribute message that comprises the one or more attributes, and respective digital signatures on data messages comprising respective data entries, e.g., one for each data entry. Accordingly, these digital signatures may allow to establish authenticity of the attributes and data entries of the record. In this case, the digital signatures are preferably chosen such that they efficiently allow to perform so-called zero-knowledge proofs on them, as discussed shortly.

Interestingly, by using a digital signature comprising the attributes and separate digital signatures on respective data entries, several beneficial effects may be achieved. The digital signature comprising the attributes may comprise a fixed number of attributes, and also a digital signature on a data entry may have a fixed-length input, e.g., a digest of the data entry. This is useful because the digital signatures may thus have a fixed message size, and accordingly, a fixed formatting. This is particularly important when using the signatures for zero-knowledge proofs, as discussed below, since efficient techniques to perform such proofs may rely on the use of fixed-format messages.

Moreover, the use of separate digital signatures on data entries may allow a selective disclosure to be performed by processing only the digital signatures on data entries that are actually disclosed, e.g., instead of having to perform operations on one digital signature comprising all data entries, which is particularly important since the number of data entries, and the sizes of individual data entries, can be substantial. For example, genomics data, e.g., a VCF file, may include thousands of genome alternations. If a selective disclosure of only few of these alterations would involve processing each genome alternations or even performing advanced cryptographic operations for each alteration, the costs could become prohibitive. Moreover, the number of data entries comprised in a record may remain hidden in a disclosure from the receiver party, e.g., a receiver party may not be able to link record obtained in different interactions with the system on the basis of their containing the same number of data entries.

However, the inventors realized that, when implemented naively, the use of multiple digital signatures to sign a record has a problem when the issuer device provides multiple records. Namely, in this case, digital signatures from different records may be mixed, e.g., by a selector device, for example, to obtain a signed record with genomic information from different persons. Thus, the issuer device according to an embodiment may determine a secret record identifier, e.g., a randomly generated identifier that is specific to the particular record, and may include it in the attribute message and the data messages that it signs for that record. The issuer device can then provide the record, the secret record identifier, and the digital signatures to the selector device. The secret record identifier may thus be used to guarantee that respective digital signatures correspond to a single record provided by the issuer device. Yet, as discussed below, the secret record identifier may remain hidden to a recipient device.

When performing a selective disclosure, the selector device could now provide the attributes and data entries to be disclosed, along with their signatures, to the recipient device. However, such a solution would not be optimal from a data minimization perspective. For example, the attribute message can also contain non-disclosed attributes, but the recipient device would normally still need those attributes to verify the signature. Also, the signatures contain the secret record identifier so the recipient would normally need the secret record identifier to verify the signatures. So if, in two different disclosures, the recipient obtains non-overlapping sets of attributes and data entries from the same record, the recipient may link these two different partial records to each other based on the secret record identifier. Or, the recipient may use the secret record identifier to link its partial record to other partial records received by different recipients.

Interestingly, however, the inventors devised for the selector device to use a zero-knowledge proof to prove to the receiver that the provided values and data entries belong to a single record signed by the issuer device. As is known from cryptography, a zero-knowledge proof is a method by which one party, the prover, can prove to another party, the verifier, that they know a value satisfying a certain property. In a zero-knowledge proof, interestingly, this is done without the prover disclosing the value to the verifier. For example, in a known zero-knowledge proof, the verifier knows a public key and the prover can prove to the verifier that it knows the private key corresponding to that public key without revealing the private key to the verifier.

In this case, the selector device may perform a zero-knowledge proof with the receiver device wherein the selector device proves knowledge of the secret record identifier, the digital signature on the attribute message, and digital signatures on the data messages. In other words, the selector device typically does not disclose the secret record identifier or any of the digital signatures to the receiver device, but instead proofs that it knows a valid identifier and signatures. Concrete examples of efficiently constructing such proofs are provided below, although it is noted that generic techniques are available in the literature that allow to prove knowledge of data satisfying arbitrary relations, so that any digital signature scheme and any general zero knowledge proof system can be used in principle.

Concerning the attributes, the selector device may prove that the digital signature on the attribute message is a digital signature on a message comprising at least the one or more attributes to be disclosed and the secret record identifier. The receiver device may verify this part of the proof with respect to the one or more attributes that it has obtained from the selector device to ascertain correctness of the received attributes. The selector device may also prove that the digital signature is signed with a private key corresponding to the issuer public key, which the receiver may verify using the issuer public key. By performing this part of the proof as verifier, the receiver device may thus obtain assurance that attributes it has obtained from the receiver device are indeed part of a record provided by the issuer device.

Concerning the data entries, the selector device may prove that the digital signatures on the data messages are digital signatures on messages comprising the data entries to be disclosed and each comprising the secret record identifier, e.g., respective messages each comprising a data entry and the second record identifier. The receiver device may verify this part of the proof with respect to the data entries that it has obtained from the selector device to ascertain their correctness. The selector device may also prove that the digital signature is signed with a private key corresponding to the issuer public key, which the receiver may verify using the issuer public key. By performing this part of the proof as verifier, the receiver device may thus obtain assurance that the data entries it has obtained from the receiver device are part of the record provided by the issuer device. In particular, the proof may guarantee that each of the digital signatures comprises the secret record identifier and is thus part of the same record provided by the issuer device; still the receiver device may not actually learn the secret record identifier, preventing linking between partial records obtained in different selective disclosures.

Thus, a system is provided wherein a selector device can provide attributes and data entries of a record to a receiver device with improved privacy and/or authenticity guarantees. Moreover, different devices are provided that each provide particular features contributing to the various advantages. For example, the issuer device may determine a secret record identifier and include it in respective digital signatures for a record. The digital signatures are preferably of a type that allows efficient zero-knowledge proofs to be performed on them, examples of which are provided below, although any type of digital signature can be used in combination with a suitable zero-knowledge proof system. As another example, the selector and receiver device may perform a zero-knowledge proof to ascertain to the receiver device that the selectively disclosed values and data entries belong to a single record of the issuer device.

Because of the discussed measures, the receiver device may obtain guarantees that the obtained attributes and data entries belong to a single record provided by the issuer device. Still, the receiver device typically does not learn undisclosed attributes or data entries, or even how many data entries the record comprises. In particular, although parts of the records are linked by an identifier, this identifier may be a secret record identifier that the receiver device does not learn. The burden to perform the selective disclosure is removed from the issuer device, which may only need to provide its record once to the selector device and may not need to be involved afterwards. The system may be particularly suitable for large and/or dynamic sets of data entries, since a selective disclosure of a subset of the multiple data entries typically involves computation and communication scaling in the number of disclosed data entries, not in the total number of data entries. For example, instead of disclosing a full genome, only relevant portions may be disclosed, with the disclosure scaling only in the number of relevant portions. Accordingly, improved selective disclosure of parts of a record is provided.

In an embodiment, the attributes of the record may comprise one or more phenotype attributes about a person. The data entries of the record may comprise one or more genome portions of the person. For example, the system may be a system for providing genomic data to a researcher for medical research. Given the sensitivity of genomic data and also to improve compliance with privacy regulations in various jurisdictions, it is important for such a record to be de-anonymized; at the same time, the number of genomic portions in the record may be large, e.g., the record may comprise the whole sequenced genome of the person or large parts of it. In such cases, allowing selective disclosure of a subset of the set of genomic portions as described, hence the beneficial scaling characteristics as described herein are particularly relevant.

Various digital signature schemes can be used to sign the attribute message and the data messages for the multiple data entries. As discussed before, in principle any digital signature scheme can be used. Various particularly advantageous options are now discussed.

Various embodiments are based on anonymous credentials. Anonymous credentials are known per se in the art as a way for a user to obtain a certification by a credential issuer on one or more of its attributes, e.g., the user's age and country of origin. The user can anonymously show the credential to a third party to prove that he/she satisfies particular properties, e.g., the age is at least 18, without revealing information that allows to link back to the user. Attributes of anonymous credential schemes are typically assumed to be numeric; other types of attributes can be encoded in various ways, e.g., a textual attribute may be encoded as a numeric attribute by applying a one-way function to the text, etc.

Examples of such anonymous credential schemes are disclosed, for example, in J. Camenisch et al., "Signature schemes and anonymous credentials from bilinear maps", Proceedings CRYPTO '04 (incorporated herein by reference insofar as the description of the anonymous credential scheme is concerned) and in J. Camenisch et al., "An Accumulator Based on Bilinear Maps and Efficient Revocation for Anonymous Credentials", Proceedings PKC '09 (incorporated herein by reference insofar as the description of the anonymous credential scheme is concerned).

Interestingly, in an embodiment, anonymous credentials may be re-purposed for the systems presented herein, in the sense that the digital signature on the attribute message as presented herein comprises an anonymous credential signed with the issuer private key. The anonymous credential may have the one or more attributes of the record and the secret record identifier as attributes. In effect, anonymous credentials are used "in reverse". Traditionally, a user and an issuer run an issuance protocol for the user to obtain a credential about attributes that the issuer may not know the values of; upon request by a third party to prove a property, the user uses the issued anonymous credential. In contrast, in the present case, no such issuance protocol is needed and the issuer device can provide the credential to the selector device directly. Unlike in the traditional case, the selector device that holds the credential is typically an intermediate party to whom the credential does not relate, e.g., the selector device can hold different records about different entities, e.g. persons, that it is not related to. The selector device can then selectively disclose parts of these records and/or show or prove properties of attributes out of its own volition. Despite these differences, interestingly, anonymous credentials can still be used as a building block in the present system.

In some embodiments, the digital signature scheme used for the data messages is the same as the one for the attribute message, e.g., a digital signature for a data entry may be an anonymous credential with the secret record identifier and the data entry, or a one-way function applied to the data entry, as attributes. This leads to a particularly simple design.

However, it is also possible to optimize the signing of the data messages in various ways, e.g., by relying on the fact that data messages need not contain the values of multiple attributes.

In some embodiments, the digital signature on the data message is based on a sum of at least the secret record identifier $\gamma$ and a digest H (m) of the data entry m. For example, digest H may be a cryptographic hash function or similar. As the inventors realized, by signing the value $\gamma+H(m)$ rather than the individual values $\gamma$ and H (m), it becomes possible to use more efficient signature schemes, for example, signature schemes for signing and/or proving properties of single values instead of signatures schemes for signing and/or proving properties of multiple attributes. Interestingly, even when γ and H(m) are combined by taking a sum, still, since H(m) is a digest, it may not be feasible for the selector device to find another data message m' that gives the same value for sum, e.g., γ+H(m)=γ+H(m'), or even that leads to a sum for another secret identifier, e.g., γ+H(m)=+ H(m'), so the sum may still provide sufficient authenticity for both the secret identifier and the data entry.

In some embodiments, the digital signature on data entry m is computed by computing an exponentiation of a group element g to a multiplicative inverse of a value that is based on at least the issuer private key x, the secret record identifier γ, and the data entry m. Signature schemes based on exponentiation to a multiplicative inverse are known in the art per se and can provide small signatures with efficient zero-knowledge proofs, e.g., see D. Boneh et al., "Short signatures without random oracles and the SDH assumption in bilinear groups", J. Cryptology, 21(2):149-177, 2008 (incorporated herein insofar as the description of the short signature scheme is concerned). For example, the secret record identifier and data entry may be combined to form the message to be signed. In an embodiment, the plaintext comprises a sum of the secret record identifier and a digest of the message as discussed above, e.g., the signature may be $g^{1/x+\gamma+H(m)}$. This is an example of a particularly storage-efficient signature, comprising only one group element. Various alternatives to using the above sum will be apparent to the skilled person, e.g., a sum of a digest of the secret record identifier and a digest of the message, etc.

In an embodiment, the issuer device is further configured to obtain updated data for one of the multiple data entries. The issuer device may generate an updated digital signature on a data message for this updated data entry. The issuer device may then provide the updated digital signature to the selector device. This way, the issuer device may dynamically update the record one data entry at a time. Interestingly, because data entries are signed in respective digital signatures, in terms of computational and communication complexity updating a single data entry may scale well, e.g., no signature over all data entries needs to be re-computed, etc.

Similarly to updating a data entry, also data entries may be added to the record, e.g., by the issuer device by providing the added data entry and signature to the selector device which updates the record, or removed from the record by the issuer device, e.g., by indicating to the selector device which data entry to remove which then updates the record. Also these operations may be efficiently implemented due to the separate signatures for separate data entries. It is also possible for the issuer device to update the set of attributes of the record, e.g., by providing an updated set of attributes or modifications to one or more attributes, along with an update digital signature on an attribute message to the selector device which then updates the record. Also this operation may be efficiently implemented because it need not involve the data entries.

In various embodiments, the selector device obtains multiple records, e.g., multiple records from a single issuer device, multiple records from multiple issuer devices, etc. The selector device may thus act as a system for providing access to the multiple records to receiver devices, for example, a centralized access point that selects and provides data to recipients, e.g., medical researchers that want to perform research on genomic data.

In an embodiment, the issuer device is configured to obtain a record query and select one or more of the multiple records to be disclosed according to the record query. For example, the receiver device may provide the record query, or the record query may be otherwise determined. Generally, the record query provides one or more conditions for records to be satisfied. For example, the issuer device may select all record satisfying the conditions, the first X records satisfying the conditions, X random records satisfying the conditions, etcetera. For example, a condition may be a condition on an attribute, e.g., the condition may state that an attribute is equal to a particular value or to another attribute, that the attribute lies in a certain range, etcetera. A condition can also be a condition on a data entry, e.g., existence of a data entry containing certain data, e.g., a genome having a particular mutation. The issuer device may then selectively disclose attributes and data entries for each current record of the selected records, e.g., by repeating the determining of attributes to be disclosed, the providing of the attributes and data entries of the current record, and the performing of the zero-knowledge proof, for each current record of the one or more selected records. This way, the receiver device may receive records relevant for its particular use.

In an embodiment, the selector device proves to the receiver device, using the zero-knowledge proof for a current record, that the current record satisfies the record query. For example, the record query may comprise a condition, e.g., age>65, on an attribute which is not provided to the receiver device. The zero-knowledge proof may be used to prove that such a condition holds. It is also possible to prove properties of data entries that are themselves not provided to the receiver device. Conditions with respect to disclosed attributes and data entries typically need not be proven in zero-knowledge because the receiver knows them. It is also not strictly necessary to prove the full record query, e.g., for efficiency reasons only the most relevant conditions of the record query may be proven. Interestingly, by means of the zero-knowledge proof, the receiver device may receive assurance that the records it receives satisfy the record query, e.g., an age was above 65, while not learning details, e.g., the exact age. Accordingly, a particularly beneficial combination of data minimization and authenticity may be obtained.

In an embodiment, the selector device further obtains a data entry query, for example, received from the receiver device or otherwise determined. The selector device may determine the one or more data entries to be disclosed according to the data entry query. For example, the data entry query may specify one or more conditions for data entries to satisfy, may specify one or more particular data entries to include, e.g., genome data at particular locations, etc. This way, it is possible to control which data entries to provide. A similar approach may be used to determine which attributes to disclose.

Of course, the use of record queries and/or data entry queries to control which records and/or parts of records to disclose, does not exclude the possibility for the selector device to perform checks on the data to be disclosed to a receiver device, e.g., the selector device may perform a check that the attributes and data entries of a set of records to be disclosed to a receiver device satisfy a certain data minimization property, e.g., a privacy property such as k-anonymity.

In an embodiment, the zero-knowledge proof may involve the selector device providing a commitment to the secret record identifier to the receiver device and proving knowledge of the digital signatures with respect to the commitment. For example, the commitment may be a Pedersen-type commitment as is known in the art. Providing the comment to the receiver device may allow the receiver device to efficiently establish that the same secret record identifier is included in respective digital signatures by providing that each of those digital signatures includes the same secret record identifier as the comment.

In an embodiment, the zero-knowledge proof may be a non-interactive zero-knowledge proof determined and sent by the selector device and received and verified by the receiver device. This may reduce the amount of communication needed, and/or allow data transfer when both parties are not online at the same time.

The techniques described herein may be applied in a wide range of practical applications. Such practical applications include platforms for providing de-anonymized datasets, for example, to researchers in a medical or financial context. For example, such a platform may be operated by a number of hospitals or an external service provider. More generally, any type of application where selective disclosure of parts of a record, especially a record containing a flexible or large set of data entries, is needed, may benefit from the techniques described herein.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all the steps of an embodiment of the method when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings:

FIG. 5 schematically shows an example of an embodiment of an issuer method;

FIG. 6 schematically shows an example of an embodiment of a selector method;

FIG. 7 schematically shows an example of an embodiment of a receiver method;

FIG. 8 schematically shows a computer readable medium having a writable part comprising a computer program according to an embodiment, FIG. 9 schematically shows a representation of a processor system according to an embodiment.

Figure 1A:
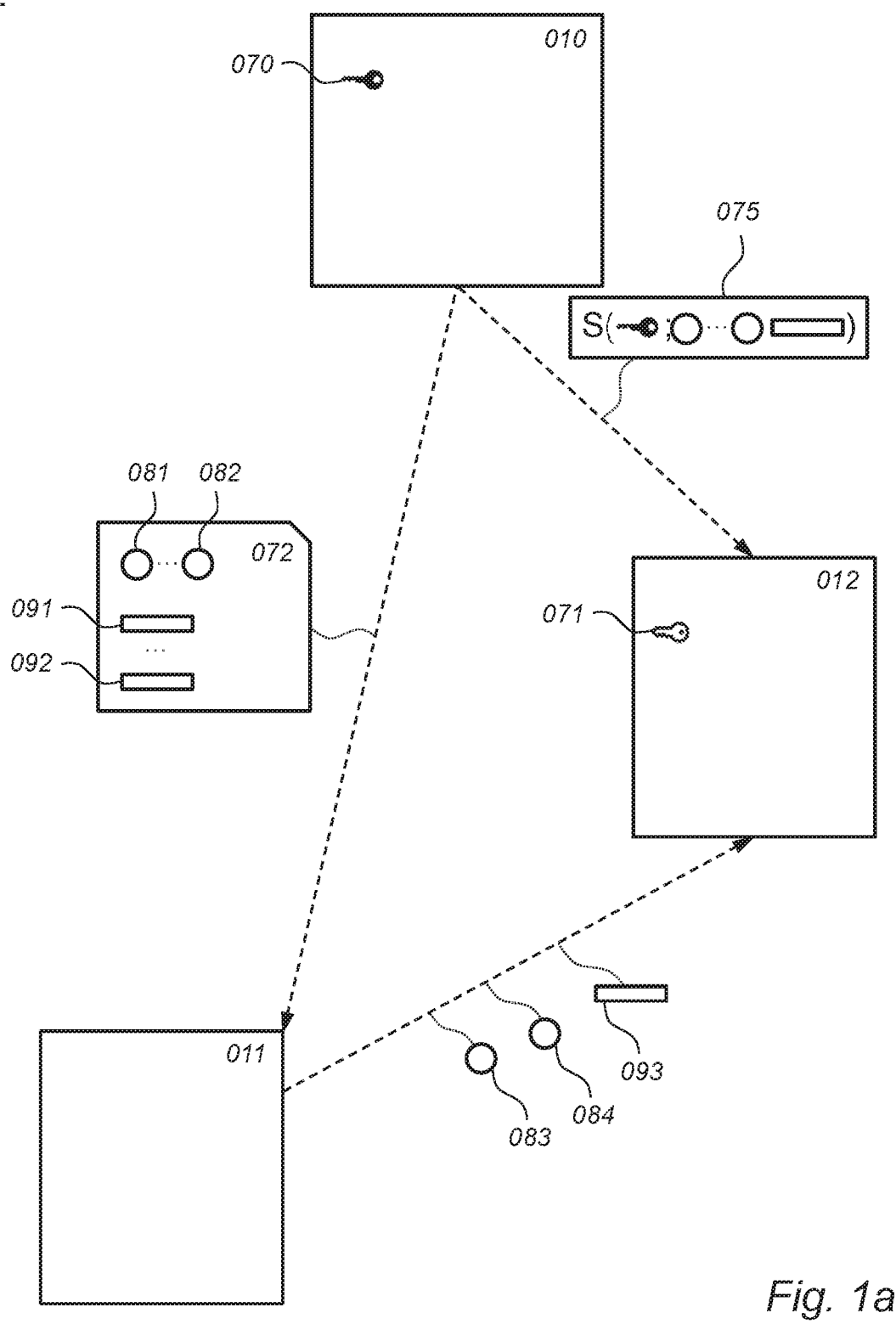
FIG. 1a schematically shows an example of a selective disclosure system that does not involve zero-knowledge proofs.

LIST OF REFERENCE NUMERALS 000, 100 a selective disclosure system
010, 110, 210 an issuer device
011, 111, 311 a selector device
012, 112, 412 a receiver device
130, 131, 132 a memory
140, 141, 142 a processor
150, 151, 152 a network interface
160 a computer network
070, 170, 270 an issuer private key
071, 171, 471 an issuer public key
072, 172, 272, 372 a record
173, 273, 373 a secret record identifier
174, 374, 474 a zero-knowledge proof
075 a digital signature on disclosed attributes and data entries
180, 280, 380 a digital signature on an attribute message
081-084, 181-184, 281-282, 381-384, 483-484 an attribute
091-093, 191-193, 291-292, 391-393, 493 a data entry
191'-192', 291'-292', 393' a digital signature on a data message
241 an identifier generation unit
242 an attribute signing unit
243 a data entry signing unit
341 a selection unit
342 a proving unit
441 a verification unit
800 a computer readable medium
810 a writable part
820 a computer program
910 integrated circuit(s)
920 a processing unit
922 a memory
924 a dedicated integrated circuit
926 a communication element
930 an interconnect
940 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

FIG. 1a shows an example of a system 000 for selectively disclosing attributes and data entries of a record, according to current best practices. System 000 does not use attribute message and data message signatures or zero-knowledge proofs as defined by the claims.

Shown in the figure is an issuer device 010 that wishes to enable a selector device 011, e.g., a genomics platform, to selectively disclose parts of a record 072. The particular record 072 shown in the figure comprises values for a predefined set of attributes 081-082, e.g., phenotype data, and a set of data entries 091-092, e.g., genotype data. Issuer device 010 provides the record to selector device 011.

When selector device 011 wants to selectively disclose parts of record 072 to a receiver device 012, the selector device may select one or more of the attributes 081-082, in this case, attributes 083 and 084, and one or more of the data entries 091-092, in this case, data entry 093, to be disclosed to the receiver device 012. The receiver device 012 may receive the attributes 083, 084 and data entries 093 to be disclosed.

Although the steps so far provide selective disclosure, e.g., only part of the record is obtained by receiver device 012, no authenticity is provided yet, e.g., the receiver device 012 does not obtain assurance that the received attributes and data entries originate from a trusted issuer device 010, and/or that the received attributes and data entries belong to the same record, e.g., all refer to the same person. To obtain such assurance using state-of-the-art techniques, a digital signature 075 may be employed. Digital signature 075 in this example may be a conventional signature, e.g., an RSA or ECDSA signature. The notation S(X; Y) adopted in the figure and throughout this description may denote a signature with private key X on a message Y. At the time of disclosure, the issuer device 010 may provide to the receiver device 012, e.g., prompted by the selector device 011, digital signature 075, signed with an issuer private key 070, on the attributes and data entries to be disclosed. Receiver device 012 may verify the digital signature 075 with respect to an issuer public key 071 corresponding to issuer private key 070. The digital signature is typically without message recovery, e.g., the message is not derived from the signature and instead the signature and message are together verified with respect to the public key 071.

Although the above system can provide selective disclosure with authenticity guarantees, it has the undesirable characteristic that the issuer device 010 needs to be involved in each selective disclosure. This is cumbersome, often expensive, and sometimes not possible, e.g., the issuer device 010 or its organization may no longer exist. Accordingly, a problem addressed below is how to perform selective disclosure with comparable authenticity guarantees, but in such a way that an issuer device does not need to be involved in a selective disclosure.

Figure 1B:
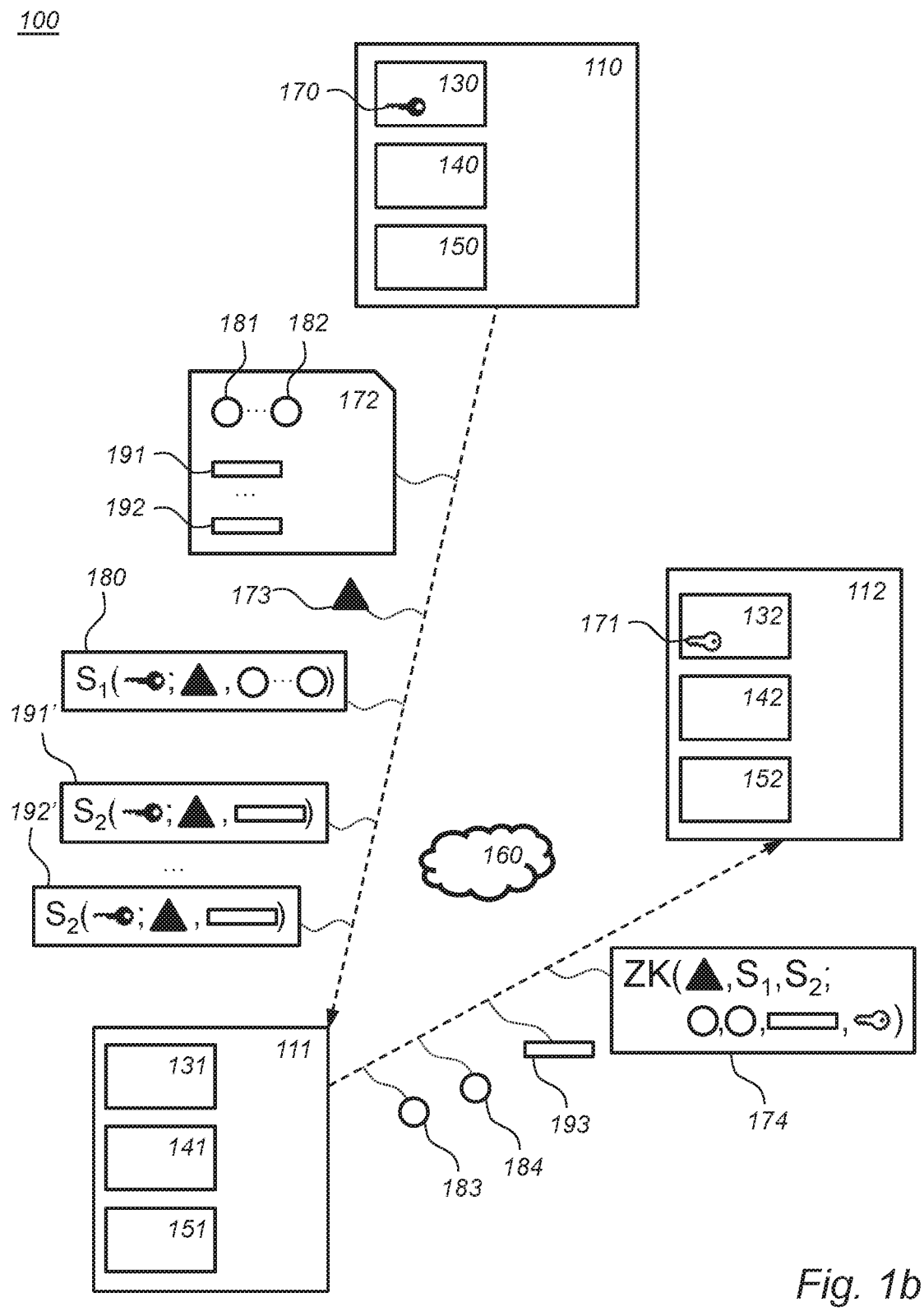
FIG. 1b schematically shows an example of an embodiment of a selective disclosure system.

FIG. 1b schematically shows an example of an embodiment of a system 100 for selectively disclosing attributes and data entries of a record 172. System 100 may comprise an issuer device 110, a selector device 111, and/or a receiver device 112.

Issuer device 110 may be for providing record 172 to selector device 111 for selective disclosure. Issuer device 110 may comprise a processor 130 and a memory 140. Memory 140 may be used for data and/or instruction storage. For example, memory 140 may comprise software and/or data on which processor 130 is configured to act. Memory 140 may also store an issuer private key 170 forming a public-private key pair with a corresponding issuer public key 171. Memory 140 may also store record 172. Record 172 may comprise one or more attributes 181-182 and multiple data entries 191-192. By way of example only, two attributes and two data entries are shown. Processor 130 may be implemented as one or more processor circuits, e.g. microprocessors, ASICs, FPGA and the like. Memory 140 may comprise computer program instructions which are executable by processor 130. Processor 130, possibly together with memory 140, is configured according to an embodiment of an issuer device. Issuer device 110 may also comprise a communication interface 150 arranged to communicate with other devices, in particular, selector device 111. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Issuer device 110 may be configured to determine a secret record identifier 173. Issuer device 110 may also be configured to generate a digital signature 180 on an attribute message using issuer private key 170, where the attribute message comprises the one or more attributes 181-182 and the secret record identifier 173. Issuer device 110 may also be configured to generate multiple digital signatures 191'-192' on multiple data messages for the multiple data entries 191-192 using the issuer private key 170. A data message for a data entry 191-192 may comprise the data entry and the secret record identifier 173. Issuer device 110 may be configured to provide the record 172, the secret record identifier 173, the digital signature 180 on the attribute message, and the digital signatures 191'-192' on the data messages to the selector device 111.

As shown in the figure and used throughout this description, $S_1(X; Y)$ and $S_2(X; Y)$ may be used to refer to digital signatures signed using private key X on messages Y. As shown by the subscripts, different digital signature schemes may be used for signature 180 and signatures 191'-192', although this is not necessary. The digital signatures are typically without message recovery, e.g., the digital signature may be verified together with the message using a public key corresponding to the private key.

Selector device 111 may be for selectively disclosing attributes and data entries of record 172 to receiver device 112. Selector device 111 may comprise a processor 131 and a memory 141. Memory 141 may be used for data and/or instruction storage. For example, memory 141 may comprise software and/or data on which processor 131 is configured to act. Memory 141 may also store record 172, secret record identifier 173, digital signature 180 on the attribute message and/or digital signatures 191'-192' on the data messages. Processor 131 may be implemented as one or more processor circuits, e.g. microprocessors, ASICs, FPGA and the like. Memory 141 may comprise computer program instructions which are executable by processor 131. Processor 131, possibly together with memory 141, is configured according to an embodiment of a selector device. Selector device 111 may also comprise a communication interface 151 arranged to communicate with other devices, in particular, issuer device 110 and receiver device 112. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Selector device 111 may be configured to obtain record 172, secret record identifier 173, digital signature 180 on the attribute message and digital signatures 191'-192' on the data messages. Selector device 111 may be further configured to determine one or more attributes to be disclosed as a subset of the one or more attributes 181-182. By way of example only, the figure shows two attributes 183-184 to be disclosed. Selector device 111 may be further configured to determine one or more data entries to be disclosed as a subset of the multiple data entries 191-192. By way of example, a single data entry 193 to be disclosed is shown. Selector device 111 may be configured to provide the one or more attributes to be disclosed 183, 184 and the one or more data entries to be disclosed 193 to the receiver device 112.

Selector device 111 may be further configured to perform a zero-knowledge proof 174 with receiver device 112. The zero-knowledge proof is shown here as a message being sent from selector device 111 to receiver device 112, e.g., a non-interactive zero-knowledge proof, but this not necessary, e.g., the zero-knowledge proof may comprise multiple messages being exchanged between the parties.

As used in this figure and throughout the description, the notation ZK(X;Y) denotes a zero-knowledge proof that values X satisfy a certain property with respect to values Y. E.g., values X are comprised in the so-called witness of the zero-knowledge proof. The prover typically uses values X to perform the proof and the verifier typically verifies the proof using values Y.

In the zero-knowledge proof, the selector device may prove knowledge of:

the secret record identifier 173;
the digital signature 180 on the attribute message as being a digital signature on a message comprising at least the one or more attributes to be disclosed 183-184 and the secret record identifier, signed with a private key corresponding to the issuer public key 171; and
the digital signatures 191'-192' on the data messages for the data entries to be disclosed 193 as being digital signatures on messages comprising the data entries to be disclosed 193 and each comprising the secret record identifier, signed with a private key corresponding to the issuer public key 172.

Receiver device 112 may be for selectively obtaining the attributes 183-184 and data entries 193 of the record 172 from the selector device 111. Receiver device 112 may comprise a processor 132 and a memory 142. Memory 142 may be used for data and/or instruction storage. For example, memory 142 may comprise software and/or data on which processor 132 is configured to act. Memory 142 may also store issuer public key 171. Processor 132 may be implemented as one or more processor circuits, e.g. microprocessors, ASICs, FPGA and the like. Memory 142 may comprise computer program instructions which are executable by processor 132. Processor 132, possibly together with memory 142, is configured according to an embodiment of a receiver device. Receiver device 112 may also comprise a communication interface 152 arranged to communicate with other devices, in particular, selector device 111. For example, the communication interface may comprise a connector, e.g., a wired connector, e.g., an Ethernet connector, or a wireless connector, e.g., an antenna, e.g., a Wi-Fi, 4G or 5G antenna. The communication interface may also be a storage interface to an internal or external data storage, a keyboard, an application interface (API), etc.

Receiver device 112 may be configured to obtain from the selector device 111 the one or more attributes 183-184 and the one or more data entries 193. Receiver device 112 may be further configured to perform the zero-knowledge proof with the selector device 111 with respect to the obtained values 183-184 and data entries 193 and the issuer public key 174 to ascertain that the obtained values 183-184 and data entries 193 belong to the record 172 of the issuer device 110.

The various devices of system 100 communicate with each other over a computer network 160. The computer network may be an internet, an intranet, a LAN, a WLAN, etc. Computer network 160 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. Computer network 160 may comprise additional elements, e.g., a router, a hub.

The various devices of FIG. 1 may have respective user interfaces, which may include well-known elements such as one or more buttons, a keyboard, display, touch screen, etc. For example, the user interface of the receiver device 112 may be arranged for accommodating user interaction for obtaining parts of records satisfying particular record and/or data entry queries.

Figure 2:
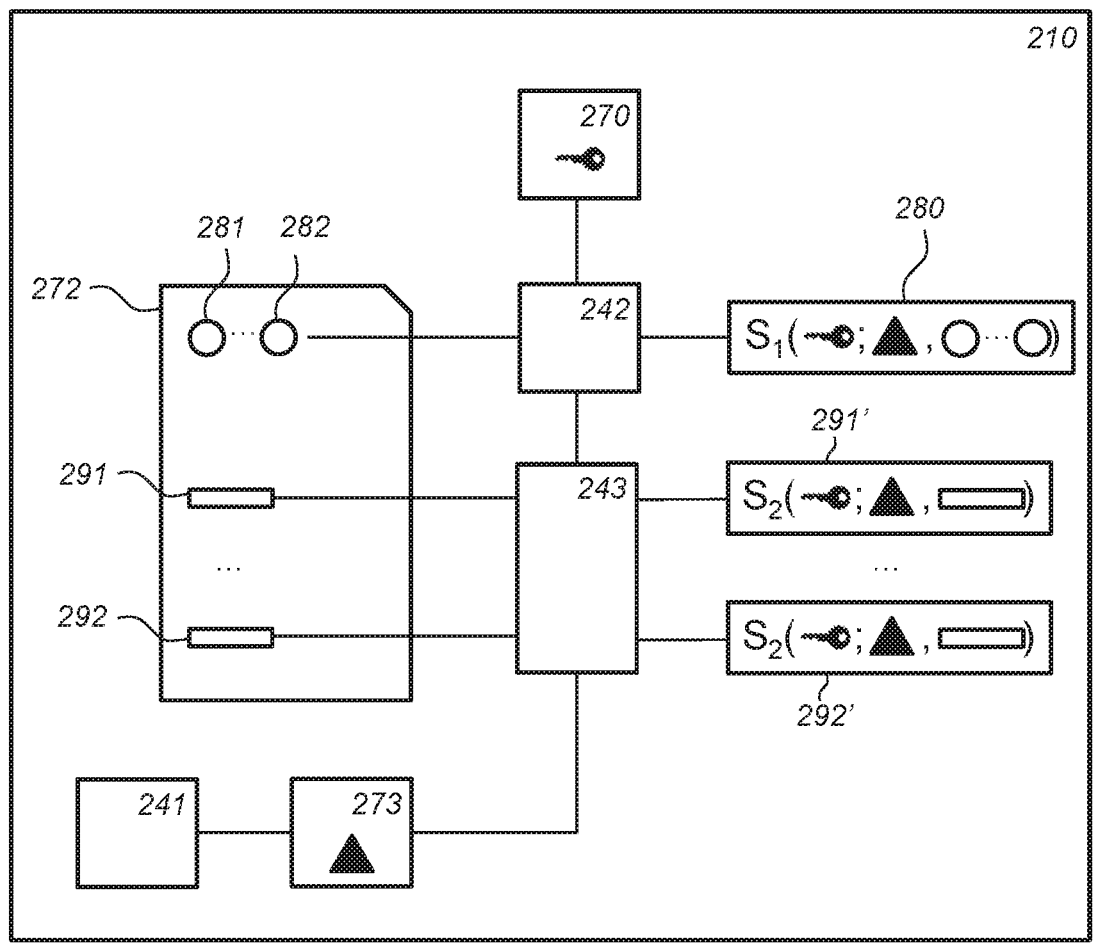
FIG. 2 schematically shows an example of an embodiment of an issuer device.

FIG. 2 schematically shows an example of an embodiment of an issuer device 210 for providing a record to a selector device for selective disclosure, for example, for use in system 100 of FIG. 1b.

FIG. 2 schematically shows functional units that may be functional units of a processor of issuer device 210 (not shown separately). For example, FIG. 2 may be used as a blueprint of a possible functional organization of the processor. For example, the functional units shown in FIG. 2, e.g., units 241-243, may be wholly or partially be implemented in computer instructions that are stored at device 210, e.g., in an electronic memory of device 210, and are executable by a microprocessor of device 210. In hybrid embodiments, functional units are implemented partially in hardware, e.g., as coprocessors, and partially in software stored and executed on device 210. For the purpose of explication, FIG. 2 also shows various elements that may be stored by the device 210 at various stages of its operation.

Shown in the figure is a record 272 comprising one or more attributes 281-282 and multiple data entries 291-292. For example, record 272 may be a genomic record. In such a case, attributes 281-282 may comprise phenotype attributes of a person, e.g., one or more of an age, a BMI, flags indicating diagnoses for one or more medical conditions, etcetera. In this example, attributes are integers or other type of values encoded as integers. The integers are typically from a range 0, . . . , N−1 where value N is defined by the signature scheme(s) used, as discussed below. Data entries 291-292 may comprise genome portions of the person.

As an illustrative example, data entries of record 272 may represent single nucleotide polymorphisms (SNPs) of a person's genome. For example, record 272 may be derived from, or encoded by, a Variant Call Format (VCF) file. As is known in bioinformatics, a VCF file may be used to store gene sequence variations with respect to a reference genome. Optionally, a VCF file can also store phenotype information. A portion of a VCF file is shown below:

| #CHROM | POS | ID | REF ALT | QUAL | FILTER INFO | | | | FORMAT | |
| --- | --- | --- | --- | --- | --- | --- | --- | --- | --- | --- |
| chr1 | 82154 | rs4477212 | a | . | . | . | . | . | GT | 0/0 |
| chr1 | 752566 | rs3094315 | g | A | . | . | . | . | GT | 1/1 |

-continued

| #CHROM | POS | ID | REF ALT | QUAL | FILTER | INFO | FORMAT | |
|---|---|---|---|---|---|---|---|---|
| chr1 | 752721 | rs3131972 | A G | . | . | . | GT | 1/1 |
| chr1 | 798959 | rs11240777 | g . | . | . | . | GT | 0/0 |
| chr1 | 800007 | rs6681049 | T c | . | . | . | GT | 1/1 |
| chr1 | 838555 | rs4970383 | c . | . | . | . | GT | 0/0 |
| chr1 | 846808 | rs4475691 | C . | . | . | . | GT | 0/0 |
| chr1 | 854250 | rs7537756 | A . | . | . | . | GT | 0/0 |
| chr1 | 861808 | rs13302982 | A . | . | . | . | GT | 1/1 |
| chr1 | 873558 | rs1110052 | A G | . | . | . | GT | 1/1 |
| chr1 | 882033 | rs2272756 | G T | . | . | . | GT | 0/1 |
| chr1 | 888659 | rs3748597 | T C | . | . | . | GT | 1/1 |
| chr1 | 891945 | rs13303106 | A G | . | . | . | GT | 0/1 |

For example, for a record corresponding to a VCF file as illustrated above, data entries of the record may correspond to lines of the VCF file. For example, a data entry may be a string representing a line of a VCF file.

Further shown in the figure is an identifier generation unit 241. Identifier generation unit 241 may generate secret record identifier 273. Typically, secret record identifier 273 is an integer, e.g., from the same range 0, . . . , N−1 as attributes 281-282. It is beneficial to generate secret record identifier 273 randomly from a large domain such that it is unpredictable to other devices and to minimize the probability of collision between identifiers, e.g., generated by other devices. For example, identifier generation unit 241 may generate secret record identifier 273 randomly from at least $2^{30}$, at least $2^{62}$, or $2^{126}$ possible values.

Also shown is an issuer private key 270, which may be generated by the issuer device 210 or otherwise obtained. Issuer private key 270 can be any kind of secret key compatible with the digital signature schemes used to generate digital signatures 280, 291'-292' discussed below.

Shown further an attribute signing unit 242. Attribute signing unit 242 may generate digital signature 280 on an attribute message using issuer private key 270. The attribute message may comprise the one or more attributes 281-282 and the secret record identifier 273. Although, as discussed elsewhere, any signature scheme $S_1$ can in principle used, it is particularly beneficial for the digital signature 280 to be an anonymous credential; in other words, for the signature generation to be an algorithm to generate an anonymous credential. The secret record identifier 273 may be used as an attribute of the anonymous credential.

As a concrete example, using the anonymous credential scheme from the papers "Signature schemes and anonymous credentials from bilinear maps" and "An Accumulator Based on Bilinear Maps and Efficient Revocation for Anonymous Credentials" mentioned above, given an ordered list of attributes m, the signature may be a quadruple (c, s, γ, σ) where attribute signing unit 242 generates values c, s, and γ randomly and computes σ as $$\sigma = \left(h_0 \prod_{i \in H} h_i^{m_i} \tilde{h}^\gamma \tilde{h}^s\right)^{1/x+c},$$

where x is the secret key 273 whose associated public key y is trusted by the receiver device. H may be a set of generators $h_i$ of a group G of prime order q, and similarly for $\tilde{h}$ and $h_0$. Here, γ, 273 is the secret record identifier which is in this notation considered to be part of the signature. Interestingly, $\tilde{h}$ may be a generator of group G used to include secret record identifier γ into the signature.

Shown also is a data entry signing unit 243. Data entry signing unit 243 may generate multiple digital signatures 291', 292' on multiple data messages for the multiple data entries 291-292 using the issuer private key 270, for example, a signature for each data entry. As discussed above, various choices for signature scheme $S_2$ are possible, including using signature scheme $S_1$ also used for the attribute message. In this case, a data message may be regarded as an attribute message containing two attributes: the secret record identifier and the data entry or its digest. Signature scheme $S_2$ preferably uses a secret key compatible with the secret key of signature scheme $S_1$ although secret key 270 could also be a pair of respective secret keys for the schemes $S_1$ and $S_2$.

A data message for a data entry may comprise the data entry m, 291-292 and the secret record identifier γ, 273. In particular, the digital signature on the data message may be based on a sum γ+H(m) of at least the secret record identifier γ and a digest H(m) of the data entry, e.g., a SHA256 hash of the data entry, e.g., the line of the VCF file. As discussed, such a sum may effectively bind the signature both to the secret record identifier γ and the message m in the sense that it is hard for a recipient to find another message m' that leads to the same sum γ+H(m) for present secret identifier γ or another secret identifier in use in the system.

Data signing unit 243 may generate digital signature 291', 292' by computing an exponentiation of a group element g to a multiplicative inverse of a value, where the value may be based on at least the issuer private key x, 270, the secret record identifier γ, 273, and the data entry, 291-292, e.g., value x+γ+H(m) based on the sum γ+H(m) discussed above. For example, signature $S_i$ for data entry $m_i$ may be computed as:

$$S_i = h^{\frac{1}{x+\gamma+H(m_i)}}.$$

The general concept of using an exponentiation to a multiplicative inverse as a digital signature is known per se from D. Boneh et al., "Short signatures without random oracles and the SDH assumption in bilinear groups", J. Cryptology, 21(2):149-177, 2008. Interestingly, however, in signature $S_i$ above, secret record identifier γ that was previously embedded in σ may also be included in the signature here. Thereby, the signatures $S_i$ and σ may be tied together, enabling a selector device to prove that issuer device 210 generated them as part of the same record 272.

Issuer device 210 may further provide record 272, secret record identifier 273, digital signature 280 on the attribute message, and digital signatures 291'-292' on the data messages to the selector device, e.g., send them via a communication interface (not shown).

Although, so far, the signing process has been discussed with respect to a single record 272, the same units 241-243 may also be used to produce respective secret identifiers and sets of signatures for multiple records. Also, issuer device 210 may add data entries, update data entries, or update attributes of a record by having units 242, 243 determine new attribute message signatures or data message signatures as appropriate. For example, issuer device 210 may obtain updated data for a data entry, e.g., data entry 292; generate an updated digital signature 292' on a data message for the updated data entry 292, and provide the updated digital signature 292' to the selector device 210, and similarly for other modifications.

Figure 3:
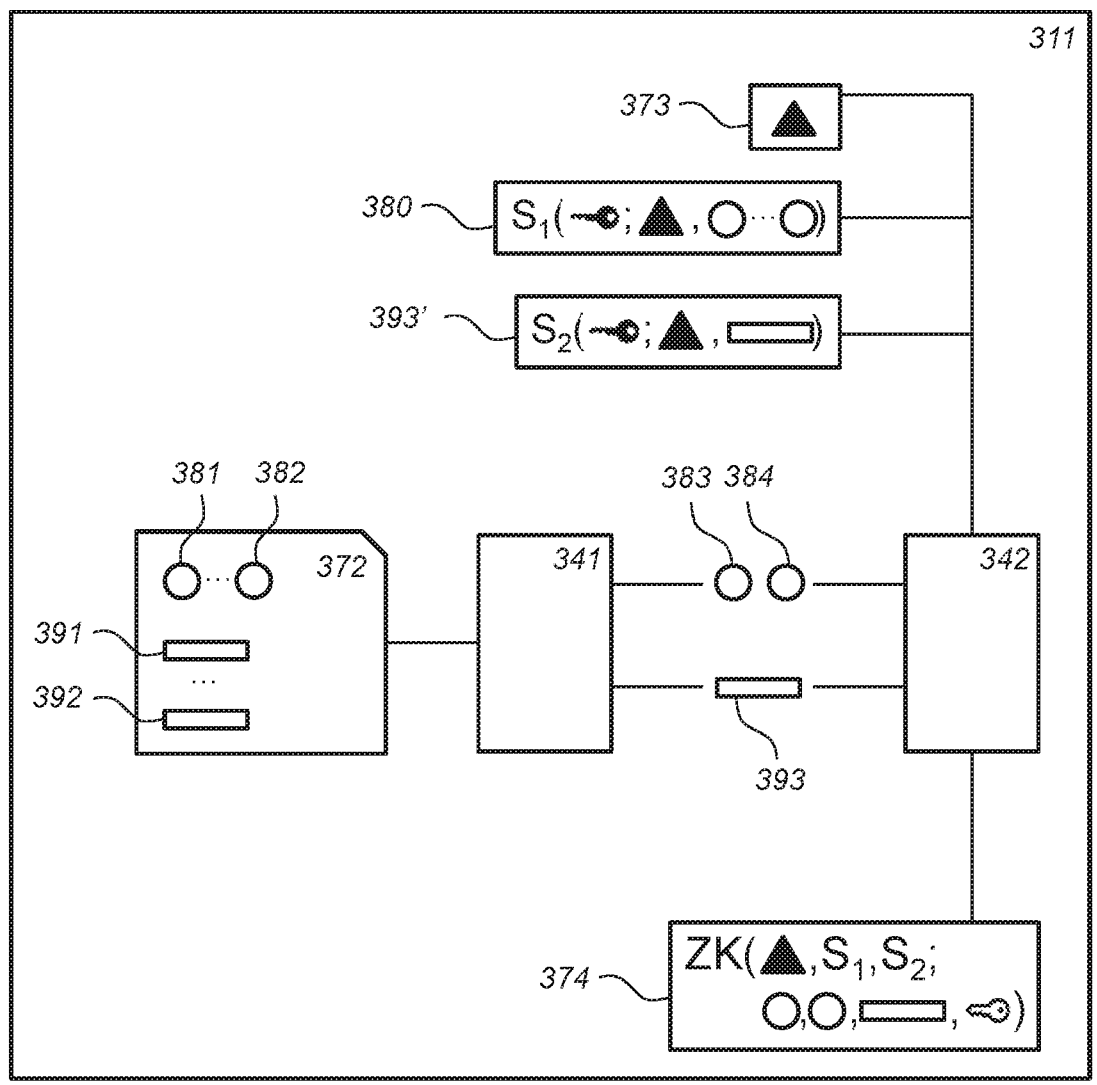
FIG. 3 schematically shows an example of an embodiment of a selector device.

FIG. 3 schematically shows an example of an embodiment of a selector device 311 for selectively disclosing attributes and data entries of a record 372 to a receiver device, for example, for use in system 100 of FIG. 1b.

FIG. 3 schematically shows functional units that may be functional units of a processor of selector device 311 (not shown separately). For example, FIG. 3 may be used as a blueprint of a possible functional organization of the processor. For example, the functional units shown in FIG. 3, e.g., units 341-342, may be wholly or partially be implemented in computer instructions that are stored at device 311, e.g., in an electronic memory of device 311, and are executable by a microprocessor of device 311. In hybrid embodiments, functional units are implemented partially in hardware, e.g., as coprocessors, and partially in software stored and executed on device 311. For the purpose of explication, FIG. 3 also shows various elements that may be stored by the device 311 at various stages of its operation.

Shown in the figure are a record 372 comprising one or more attributes 381-382 and comprising multiple data entries 391-392; a secret record identifier 370; a digital signature 380 on an attribute message generated using an issuer private key, where the attribute message comprises the one or more attributes 381-382 and the secret record identifier 370; and a digital signatures 393' on a data message generated using the issuer private key, where a data message for a data entry comprises the data entry and the secret record identifier 370. Although not shown in the figure, device 311 typically stores a respective digital signature for each data entry 391-392. For example, the record, secret record identifier, and digital signatures may correspond to those of FIG. 2. For example, this data may be obtained from an issuer device.

Also shown is a selection unit 341. Selection unit 341 may determine one or more attributes to be disclosed to the receiver device as a subset of the one or more attributes 381-382, and one or more data entries to be disclosed to the receiver device as a subset of the multiple data entries 391-392. In this particular example, attributes 383, 384 and data entry 393 are selected. The attributes and data entries to be disclosed may be determined based on a data entry query, e.g., provided by the receiver device, e.g., the data entry query may indicate particular data entries to be disclosed and/or criteria for selecting data entries, and similarly for the attributes. The selection unit 341 may additionally perform the selection based on criteria and/or checks that are not provided by the receiver device, e.g., a privacy policy, e.g., provided by the issuer device along with the record.

Shown furthermore is a proving unit 342. Proving unit 342 may perform a zero-knowledge proof 374 with the receiver device. As is known in cryptography and discussed elsewhere, a zero-knowledge proof is for letting a prover prove a statement to a verifier. The zero-knowledge proof preferably satisfies the properties of completeness, soundness, and zero-knowledge.

Completeness means that if the statement is true, then a prover who follows the protocol will convince a verifier who follows the protocol. Soundness means that, if the statement is false, a cheating prover is unlikely to be able to convince a verifier who follows the protocol. In the case of a proof of knowledge, completeness may also mean not only that the statement is true but also that the prover knows certain values, called the witness, occurring in the statement. Completeness typically holds up to a certain soundness error by which a cheating verifier succeeds in convincing the verifier; the zero-knowledge proof may however comprise multiple instances of the protocol to reduce the soundness error.

Zero-knowledge means that the verifier does not learn information from the proof other than the fact that the statement is true. Zero-knowledge may be computational and/or statistical.

In this case, selector device may use zero-knowledge proof 374 to prove knowledge of the secret record identifier 373; the digital signature 380 on the attribute message as being a digital signature on a message comprising at least the one or more attributes 383, 384 to be disclosed and the secret record identifier 373, signed with a private key corresponding to the issuer public key; and the digital signatures 393' on the data messages for the data entries to be disclosed 393 as being digital signatures on messages comprising the data entries to be disclosed 393 and each comprising the secret record identifier 373, signed with a private key corresponding to the issuer public key. In other words, witnesses of the zero-knowledge proof may include the secret record identifier and the signatures; the public values with respect to which their validity is proven may include the attributes 383, 384, data entries 393', and the issuer public key.

In particular, in order to prove that the signatures 380, 393' each comprise the same secret record identifier 373 without disclosing the secret record identifier to the receiver device, proving unit 342 may construct a commitment to the secret record identifier, e.g., a Pedersen-type commitment, and provide it to the receiver device. Accordingly, the zero-knowledge proof 374 may prove that the same secret record identifier 373 is included in each signature and in the commitment. For various kinds of zero-knowledge proofs and signature schemes, this may be an efficient way of proving the existence of a common secret identifier.

Many different types of zero-knowledge proofs are known in the art and may be readily applied, e.g., $\Sigma$-protocols such as the Schnorr protocol; non-interactive zero-knowledge proofs, e.g., obtained from an interactive zero-knowledge protocol by means of the Fiat-Shamir heuristic; zero-knowledge succinct non-interactive arguments of knowledge (zk-SNARKs), etc.

It is however particularly beneficial if, rather than relying on generic techniques, signatures scheme $S_1$ for the attributes and $S_2$ for the data entries are used that admit efficient proofs of knowledge of the signatures. For example, it can be beneficial to base signature schemes $S_1$ and/or $S_2$ on an anonymous credential scheme, e.g., the scheme by Camenisch et al. discussed above, since they admit efficient zero-knowledge proofs to be performed. For signatures $S_2$ on the data entries, also the use of signatures based on the principle of exponentiating a group element to a multiplicative inverse is particularly efficient, since again, this admits efficient zero-knowledge proofs.

A particularly beneficial implementation based on an attribute signature 380 of the form $$\sigma = \left(h_0 \prod_{i \in H} h_i^{m_i} \tilde{h}^\gamma \tilde{h}^s\right)^{1/x+c}$$

and data entry signatures 393' of the form $$S_i = h^{\frac{1}{x+y+H(m_i)}},$$

is now discussed in detail.

It is noted that the zero-knowledge proof is presented here as an interactive proof, but with the understanding that it can be made non-interactive, e.g., using the Fiat-Shamir heuristic. The proof can also be extended to prove properties about attribute values, e.g., to prove that the record satisfies a record query, e.g., 30≤BMI≤40. Proofs about multiple records can also be performed in parallel and/or combined into one non-interactive zero-knowledge proof using known techniques.

In detail, in this example, proving unit 342 may construct a commitment $X = \tilde{h}^\gamma \cdot \tilde{h}^t$, for generator $\tilde{h}$ and randomly generated value t, to secret record identifier $\gamma$. The commitment may be provided to the receiver device.

In a first part of the zero-knowledge proof, proving unit 342 may prove knowledge of signature 380 as a signature on a message comprising the one or more attributes to be disclosed and a secret record identifier corresponding to commitment X described above, and signed with private key x corresponding to public key $y = h^x$. For example, using the Camenisch-Stadler notation as described in J. Camenisch et al., "An Accumulator Based on Bilinear Maps and Efficient Revocation for Anonymous Credentials", Proceedings PKC '09, a first part of the zero-knowledge proof may be used to prove that:

$$C = h^p \tilde{h}^{\sim open} \bigwedge 1 = C^c h^{-mult} \tilde{h}^{\sim open-tmp} \frac{e\left(h_0 \prod_j h_j^{m_j} \cdot X, h\right)}{e(A, y)} =$$

$$e(A, h)^c \cdot e(\tilde{h}, y)^{-p} \cdot e(\tilde{h}, h)^{-mult} \cdot e(\tilde{h}, h)^{-s} \cdot \prod_j e(h_j, h)^{-m_j} \cdot e(\tilde{h}, h)^t$$

Here, $A = \sigma \tilde{h}^p$ is a blinding of signature $\sigma$ with random value p generated by proving unit 342 and provided to the receiver device. $\Pi_j h_j^{m_j}$ sums over disclosed attributes whereas $\Pi_j e(h_j, h)^{-m_j}$ sums over non-disclosed attributes, optionally encoded as hashes, etc.

Above, e is used to denote a cryptographic pairing, e.g., a type-3 elliptic curve pairing such as a pairing over a 256-bit Barreto-Naehrig (BN) Curve as known in the art. The pairing over the BN curve may be denoted formally as follows: $e(G_1 \times G_2) \to G_T$. The various generators used above, e.g., the generators of H, the introduced generator $\tilde{h}$, etc., may be generators of $G_1$, generated in a nothing-up-my-sleeves method, e.g., hashing a base generator of $G_1$ until a point is encountered. With these choices, for example, data entry signatures 393' may be only 32 bytes.

In a second part of the zero-knowledge proof, it may be proven that $$X = \tilde{h}^\gamma \cdot \tilde{h}^t,$$

e.g., knowledge of the secret identifier in the commitment X may be proven. The above proofs may be carried out by a suitable adaptation of the proofs discussed in J. Camenisch et al., "An Accumulator Based on Bilinear Maps and Efficient Revocation for Anonymous Credentials", themselves based on the Schnorr proof system as disclosed, e.g., in U.S. Pat. No. 4,995,082A. Interestingly, the above proofs may deviate from the zero-knowledge proof of Camenisch in that commitment X is required to match the secret record identifier $\gamma$ in signatures 380, 393'. Accordingly, a fraudulent party may not be able to combine signatures over multiple records in a dingle disclosure.

At this point it is observed that only the attributes, e.g., phenotype data, are used in the above parts of the zero-knowledge proof, not the data entries, e.g., the genomic information. Accordingly, these parts do not scale in the number of data entries.

In another part of the zero-knowledge proof, knowledge may be proven of the digital signatures 393' on messages comprising data entries 393 and secret record identifier 370. This part of the zero-knowledge proof may be obtained by adapting a vectorized version of the known zero-knowledge proof over Boneh-Boyen signatures to the inclusion of the secret record identifier. This part of the zero-knowledge proof may work on a data-entry-by-data-entry basis. E.g., for each data entry to be disclosed, the receiver device may obtain a proof that the data entry corresponds to the record. Accordingly, an efficient solution is obtained since proofs are only with respect to data entries to be disclosed, not with respect to non-disclosed data entries as would be the case if they were all included in the same signature or similar; and moreover, instead of using relatively expensive proofs with respect to Camenisch-type signatures, more efficient proofs with respect to Boneh-Boyen-type signatures may be used.

In detail, in this part of the zero-knowledge proof, the proving unit 342 may randomize respective data entry signatures $S_i$ using respective randomness $v_i$ to obtain blinded data entry signatures $V_i$, e.g., $V_i = S_i^{v_i}$. Proving unit 342 may provide the blinded signatures to the verifier device and prove knowledge of signatures $S_i$ with respect to the commitments, the data entries, and the issuer public key.

For example, the proving unit 342 may generate random s, $q_i$, o, with i running over data entries to be disclosed, and provide $$Y = \tilde{h}^s \cdot \tilde{h}^o, \; a_i = e(V_i, h)^{-s} e(h, h)^{q_i}$$

to the receiver device. Upon receiving a challenge c, e.g., from the receiver device or by means of the Fiat-Shamir heuristic, the proving unit 342 may generate responses $$z_\gamma = s - \gamma c, \; z_{v_i} = q_i - v_i c, \; z_t = o - tc$$

and provide them to the receiver device.

Although the above procedure has been discussed for a single record, it will be understood that selector device 311 can be readily adapted to the case where it stores multiple records and associated information, e.g., from multiple issuer devices. In such a way, selector device 311 may also selectively disclose parts of the multiple records. For example, as also discussed elsewhere, selector device 311 may obtain a record query and select one or more of the multiple records according to the record query. The steps performed by units 341 and 342 may be repeated for respective selected records to perform the selective disclose for the respective records.

Interestingly, also the zero-knowledge proof for a record may then be used to prove that the current record satisfies the record query. For example, the record query may comprise a condition on an attribute, e.g., age>65, 40≤age<65, etc. For example, in the particular case of using the adapted Camenisch anonymous credentials as signatures 380, known techniques for proving properties about attributes of such a credential may be readily used.

Figure 4:
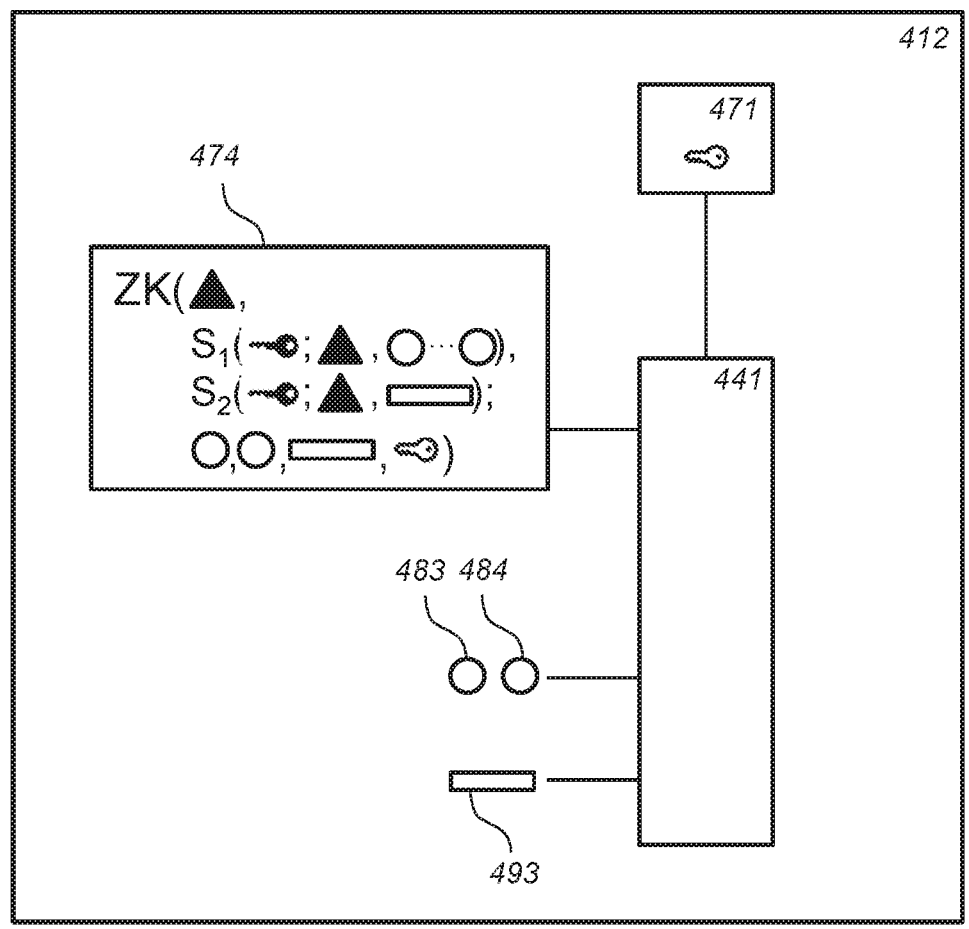
FIG. 4 schematically shows an example of an embodiment of a receiver device.

FIG. 4 schematically shows an example of an embodiment of a receiver device 412 for selectively obtaining attributes and data entries of record from a selector device, for example, for use in system 100 of FIG. 1b.

FIG. 4 schematically shows functional units that may be functional units of a processor of receiver device 412 (not shown separately). For example, FIG. 4 may be used as a blueprint of a possible functional organization of the processor. For example, the functional units shown in FIG. 4, e.g., unit 441, may be wholly or partially be implemented in computer instructions that are stored at device 412, e.g., in an electronic memory of device 412, and are executable by a microprocessor of device 412. In hybrid embodiments, functional units are implemented partially in hardware, e.g., as coprocessors, and partially in software stored and executed on device 412. For the purpose of explication, FIG. 4 also shows various elements that may be stored by the device 412 at various stages of its operation.

Shown in the figure is an issuer public key 471 stored in a memory of receiver device 412. Authenticity of the parts of the record may be established with respect to this public key. Shown further are attributes 483, 484 of the record, two in this example, data entries 493 of the record, in this case one. Receiver device 412 may receive this information from a selector device, as discussed elsewhere.

Also shown in the figure is a verification unit 441. Verification unit 441 may perform a zero-knowledge proof with the selector device with respect to the obtained values 483, 484 and data entries 493 and the issuer public key 471. Shown here is a non-interactive zero-knowledge proof 474 which verification unit 441 may verify non-interactively, but the proof may also be interactive instead, e.g., with verification unit 441 generating a challenge and providing it to the selector device. The proof may be as discussed, from the perspective of the prover, with respect to selector device 311. Proof 474 may ascertain that the obtained values 483-484 and data entries 493 belong to a record of an issuer device corresponding to issuer public key 481. Accordingly, the selector device may prove knowledge of a secret record identifier; a digital signature on a message comprising at least the one or more attributes to be disclosed 483-484 and the secret record identifier, signed with a private key corresponding to the issuer public key 471; and digital signatures on messages comprising the data entries to be disclosed 493 and each comprising the secret record identifier, signed with a private key corresponding to the issuer public key 471.

Verification of the zero-knowledge proof may be performed corresponding to the zero-knowledge proof system that the selector device uses to prove the statements discussed above. As a concrete example, again, an adapted Camenisch-type signature $$\sigma = \left(h_0 \prod_{i \in H} h_i^{m_i} \tilde{h}^\gamma \tilde{\tilde{h}}^s\right)^{1/x+c}$$

for the attributes and adapted Boneh-Boyen-type signatures $$S_i = h^{\frac{1}{x+\gamma+H(m_i)}}$$

for the data entries may be used. In this particular example, the proof in multiple parts discussed with respect to selector device 311 may be used as described above. For example, receiver device 412 may receive a commitment to the secret identifier from the selector device. The selector device may then prove knowledge, which verification unit 441 verifies, of an opening of the commitment to the secret record identifier and of signatures on attributes 483-484 and the same secret identifier, as discussed above.

Concerning the part of the proof relating to the data entries, as discussed with respect to selector device 311, the verification unit 441 may receive respective blinded signatures $V_i = S_i^{v_i}$ for data entries 493 to be disclosed. The selector device may prove knowledge of signatures corresponding to the blinded signatures and containing the respective data entries. Concretely, receiving values $$Y = \tilde{h}^s \cdot \tilde{\tilde{h}}^o, \ a_i = e(V_i, h)^{-s} e(h, h)^{q_i}$$

and responses $$z_\gamma = s - \gamma c, \ z_{v_i} = q_i - v_i c, \ z_t = o - tc$$

to a challenge c it generates, verification unit 441 may verify these responses by verifying that $$Y = = X^c \cdot \tilde{h}^{z_\gamma} \cdot \tilde{\tilde{h}}^{z_t} \bigwedge \forall i: a_i = = e(V_i, y \cdot H(m_i))^c \cdot e(V_i, h)^{-z_\gamma} \cdot e(h, h)^{z_{v_i}}$$

where y is issuer public key 471 and $m_i$ are respective data entries 493. In particular, it is noted that issuer public key 471 is multiplied in this example with the exponentiation of the hash $H(m_i)$ of the disclosed data entry. Accordingly, secret record identifier γ may be kept secret while data entry $m_i$ may still be verified to correspond to the same record as other data entries and attributes.

Although not explicitly shown in the figure, as also discussed before, the selective disclosure techniques as described herein may be applied to multiple records, possibly from different issuer devices, in which case verification unit 442 may repeat the above procedure for each disclosed record. The receiver device may also provide record queries and/or data entry queries to the receiver device to influence what records to obtain. Verification unit 441 may also be adapted to verify that such a data entry query is satisfied by the obtained record, for instance.

Accordingly, by the various measures discussed above, receiver device 412 may obtain information it needs, e.g., attributes 483, 484 and data entries 493, and appropriate authenticity guarantees with respect to public key 471, while not needing access to other sensitive material such as non-disclosed attributes and data entries, the secret record identifier or the issuer private key.

FIG. 5 schematically shows an example of an embodiment of an issuer method 500 of providing a record to a selector device for selective disclosure. Method 500 is typically computed-implemented.

Issuer method 500 may comprise storing 510 an issuer private key, the issuer private key forming a public-private key pair with a corresponding issuer public key; and the record, the record comprising one or more attributes and comprising multiple data entries;

Issuer method 500 may comprise determining 520 a secret record identifier.

Issuer method 500 may comprise generating 530 a digital signature on an attribute message using the issuer private key, the attribute message comprising the one or more attributes and the secret record identifier.

Issuer method 500 may comprise generating 540 multiple digital signatures on multiple data messages for the multiple data entries using the issuer private key, a data message for a data entry comprising the data entry and the secret record identifier.

Issuer method 500 may comprise providing 550 the record, the secret record identifier, the digital signature on the attribute message, and the digital signatures on the data messages to the selector device.

FIG. 6 schematically shows an example of an embodiment of a selector method 600 of selectively disclosing attributes and data entries of a record to a receiver device. Method 600 is typically computer-implemented.

Selector method 600 may comprise storing 610 the record, comprising one or more attributes and comprising multiple data entries; a secret record identifier; a digital signature on an attribute message generated using an issuer private key, the attribute message comprising the one or more attributes and the secret record identifier; and digital signatures on the data messages generated using the issuer private key, a data message for a data entry comprising the data entry and the secret record identifier.

Selector method 600 may comprise obtaining 620 the record, the secret record identifier, the digital signature on the attribute message and the digital signatures on the data messages.

Selector method 600 may comprise determining 630 one or more attributes to be disclosed as a subset of the one or more attributes, and one or more data entries to be disclosed as a subset of the multiple data entries.

Selector method 600 may comprise providing 640 the one or more attributes to be disclosed and the one or more data entries to be disclosed to the receiver device.

Selector method 600 may comprise performing 650 a zero-knowledge proof with the receiver device, wherein knowledge is proven of the secret record identifier;
the digital signature on the attribute message as being a digital signature on a message comprising at least the one or more attributes to be disclosed and the secret record identifier, signed with a private key corresponding to the issuer public key;
the digital signatures on the data messages for the data entries to be disclosed as being digital signatures on messages comprising the data entries to be disclosed and each comprising the secret record identifier, signed with a private key corresponding to the issuer public key.

FIG. 7 schematically shows an example of an embodiment of a receiver method 700 of selectively obtaining attributes and data entries of record from a selector device. Method 700 is typically computer-implemented.

Receiver method 700 may comprise storing 710 an issuer public key.

Receiver method 700 may comprise obtaining 720 from the selector device one or more attributes and one or more data entries.

Receiver method 700 may comprise performing 730 a zero-knowledge proof with the selector device with respect to the obtained values and data entries and the issuer public key to ascertain that the obtained values and data entries belong to a record of an issuer device corresponding to the issuer public key, wherein the selector device proves knowledge of:

a secret record identifier;
a digital signature on a message comprising at least the one or more attributes to be disclosed and the secret record identifier, signed with a private key corresponding to the issuer public key;
digital signatures on messages comprising the data entries to be disclosed and each comprising the secret record identifier, signed with a private key corresponding to the issuer public key.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 530 and 540 of method 500 may be executed, at least partially, in parallel. Moreover, a given step may not have finished completely before a next step is started.

Embodiments of the methods may be executed using software, which comprises instructions for causing a processor system to perform a method 500, 600, or 700. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of an embodiments of the method. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

FIG. 8 shows a computer readable medium 800 having a writable part 810 comprising a computer program 820, the computer program 820 comprising instructions for causing a processor system to perform an issuer method, a selector method, or a receiver method, according to an embodiment. The computer program 820 may be embodied on the computer readable medium 800 as physical marks or by means of magnetization of the computer readable medium 800. However, any other suitable embodiment is conceivable as well. Furthermore, it will be appreciated that, although the computer readable medium 800 is shown here as an optical disc, the computer readable medium 800 may be any suitable computer readable medium, such as a hard disk, solid state memory, flash memory, etc., and may be non-recordable or recordable. The computer program 820 comprises instructions for causing a processor system to perform one or said methods.

FIG. 9 shows in a schematic representation of a processor system 940 according to an embodiment. The processor system comprises one or more integrated circuits 910. The architecture of the one or more integrated circuits 910 is schematically shown in FIG. 7b. Circuit 910 comprises a processing unit 920, e.g., a CPU, for running computer program components to execute a method according to an embodiment and/or implement its modules or units. Circuit 910 comprises a memory 922 for storing programming code, data, etc. Part of memory 922 may be read-only. Circuit 910 may comprise a communication element 926, e.g., an antenna, connectors or both, and the like. Circuit 910 may comprise a dedicated integrated circuit 924 for performing part or all of the processing defined in the method. Processor 920, memory 922, dedicated IC 924 and communication element 926 may be connected to each other via an interconnect 930, say a bus. The processor system 910 may be arranged for contact and/or contact-less communication, using an antenna and/or connectors, respectively.

For example, in an embodiment, processor system 940, e.g., the issuer device, selector device, or receiver device, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

Typically, the devices each comprise a microprocessor which executes appropriate software stored at the devices; for example, that software may have been downloaded and/or stored in a corresponding memory, e.g., a volatile memory such as RAM or a non-volatile memory such as Flash. Alternatively, the devices may, in whole or in part, be implemented in programmable logic, e.g., as field-programmable gate array (FPGA). The devices may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, the issuer device comprises an identifier generation circuit, an attribute signing circuit, and a data entry signing unit. In an embodiment, the selector device comprises a selection circuit and a proving circuit. In an embodiment, the receiver device comprises a verification circuit. The devices may comprise additional circuits. The circuits implement the corresponding units described herein. The circuits may be a processor circuit and storage circuit, the processor circuit executing instructions represented electronically in the storage circuits. A processor circuit may be implemented in a distributed fashion, e.g., as multiple sub-processor circuits. Part of the storage may be read-only. The circuits may also be, FPGA, ASIC or the like. A storage may be distributed over multiple distributed sub-storages. Part or all of the memory may be an electronic memory, magnetic memory, etc. For example, the storage may have volatile and a non-volatile part.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A system comprising an issuer device, a selector device, and a receiver device, wherein the issuer device is configured to provide a record to the selector device for selective disclosure to the receiver device,
the issuer device comprising:
an issuer memory configured to store:
an issuer private key, the issuer private key forming a public-private key pair with a corresponding issuer public key;
the record, the record comprising one or more attributes and comprising multiple data entries, wherein the one or more attributes and the multiple data entries correspond to two different data types;
an issuer processor configured to:
determine a secret record identifier;
generate a digital signature on an attribute message using the issuer private key, the attribute message comprising all of the one or more attributes and the secret record identifier;
generate multiple digital signatures on multiple data messages for the multiple data entries using the issuer private key, each data message for each data entry comprising the data entry and the secret record identifier;
provide the record, the secret record identifier, the digital signature on the attribute message, and the digital signatures on the data messages to the selector device;
wherein the selector device is configured to:
receive a request for one or more selected attributes and one or more selected data entries from the receiver device, and
disclose the selected attributes and the selected data entries to the receiver device,
the selector device comprising:
a selector memory configured to store: the record, the secret record identifier, the digital signature on the attribute message and the digital signatures on the data messages;
a selector processor configured to:
determine the selected attributes to be disclosed as a subset of the one or more attributes, and the selected data entries to be disclosed as a subset of the multiple data entries;
provide the selected attributes and the selected data entries to the receiver device;
perform a zero-knowledge proof with the receiver device, wherein the selector device proves knowledge of:
the secret record identifier;
the digital signature on the attribute message as being a digital signature on a message comprising at least the selected attributes and the secret record identifier, signed with a private key corresponding to the issuer public key;
the digital signatures on the data messages for the selected data entries as being digital signatures on messages comprising the selected data entries and each comprising the secret record identifier, signed with a private key corresponding to the issuer public key;
wherein the receiver device is configured to obtain the selected attributes and selected data entries from the selector device, the receiver device comprising:

a receiver memory configured to store the issuer public key;
a receiver processor configured to:
obtain from the selector device the selected attributes and the selected data entries;
perform the zero-knowledge proof with the selector device with respect to the obtained selected attributes and selected data entries to ascertain that the obtained selected attributes and selected data entries belong to the record of the issuer device.

2. The system according to claim 1, wherein the one or more attributes comprise one or more phenotype attributes about a person; and the multiple data entries comprise one or more genome portions of the person.

3. A selector device for selectively disclosing one or more selected attributes and one or more selected data entries of a record to a receiver device that requests the selected attributes and the selected data entries, the selector device comprising:
a memory configured to store:
the record, comprising one or more attributes and comprising multiple data entries, wherein the one or more attributes and the multiple data entries correspond to two different data types;
a secret record identifier;
a digital signature on an attribute message generated using an issuer private key, the attribute message comprising all of the one or more attributes and the secret record identifier; and
digital signatures on data messages generated using the issuer private key, each data message for each data entry comprising the data entry and the secret record identifier;
a processor configured to:
obtain the record, the secret record identifier, the digital signature on the attribute message and the digital signatures on the data messages;
determine the selected attributes to be disclosed as a subset of the one or more attributes, and the selected data entries to be disclosed as a subset of the multiple data entries;
provide the selected attributes and the selected data entries to the receiver device;
perform a zero-knowledge proof with the receiver device, wherein the selector device proves knowledge of:
the secret record identifier;
the digital signature on the attribute message as being a digital signature on a message comprising at least the selected attributes and the secret record identifier, signed with a private key corresponding to the issuer public key;
the digital signatures on the data messages for the multiple data entries to be disclosed as being digital signatures on messages comprising the selected data entries and each comprising the secret record identifier, signed with a private key corresponding to the issuer public key.

4. The selector device according to claim 3, wherein the memory is configured to store multiple records, the processor being configured to:
obtain a record query from the receiver device;
select one or more of the multiple records according to the record query; and
repeat the determining, the providing, and the performing of the zero-knowledge proof for each current record of the one or more selected records.

5. The selector device according to claim 4, wherein the processor is configured to perform the zero-knowledge proof for a current record to further prove that the current record satisfies the record query.

6. The selector device according to claim 3, wherein the processor is further configured to obtain a data query, the processor being configured to determine the selected data entries to be disclosed according to the data query.

7. The selector device according to claim 3, wherein performing the zero-knowledge proof comprises providing a commitment to the secret record identifier to the receiver device and proving knowledge of the digital signatures with respect to the commitment.

8. A receiver device for selectively obtaining one or more selected attributes and one or more selected data entries of record from a selector device, the receiver device comprising:
a memory configured to store an issuer public key;
a processor configured to:
obtain from the selector device the selected attributes and the selected data entries, wherein the selected attributes and the selected data entries correspond to two different data types;
perform a zero-knowledge proof with the selector device with respect to the obtained selected attributes and the obtained selected data entries to ascertain that the obtained values and the obtained selected data entries belong to a record of an issuer device corresponding to the issuer public key, wherein the selector device proves knowledge of:
a secret record identifier;
a digital signature on a message comprising at least the selected attributes to be disclosed and the secret record identifier, signed with a private key corresponding to the issuer public key;
digital signatures on messages comprising the selected data entries to be disclosed and each comprising the secret record identifier, signed with a private key corresponding to the issuer public key.

9. The receiver device according to claim 8, wherein the receiver device is configured to perform the zero-knowledge proof by obtaining a non-interactive zero-knowledge proof from the selector device and verifying the non-interactive zero-knowledge proof.

10. A selector method of selectively disclosing one or more selected attributes and one or more selected data entries of a record to a receiver device that requests the selected attributes and the selected data entries, the selector method comprising:
storing:
the record, comprising one or more attributes and comprising multiple data entries, wherein the one or more attributes and the multiple data entries correspond to two different data types;
a secret record identifier;
a digital signature on an attribute message generated using an issuer private key, the attribute message comprising all of the one or more attributes and the secret record identifier; and
digital signatures on data messages generated using the issuer private key, each data message for each data entry comprising the data entry and the secret record identifier;
obtaining the record, the secret record identifier, the digital signature on the attribute message and the digital signatures on the data messages from an issuer device;

determining the selected attributes to be disclosed as a subset of the one or more attributes, and the selected data entries to be disclosed as a subset of the multiple data entries;

providing the selected attributes and the selected data entries to the receiver device;

performing a zero-knowledge proof with the receiver device, wherein knowledge is proven of:

the secret record identifier;

the digital signature on the attribute message as being a digital signature on a message comprising at least the selected attributes and the secret record identifier, signed with a private key corresponding to the issuer public key;

the digital signatures on the data messages for the selected data entries as being digital signatures on messages comprising the selected data entries and each comprising the secret record identifier, signed with a private key corresponding to the issuer public key.

11. A non-transitory computer readable storage medium comprising instructions to cause a processor system to perform the method according to claim 10.

12. A receiver method of selectively obtaining one or more selected attributes and one or more selected data entries of record from a selector device, the receiver method comprising:

storing an issuer public key;

obtaining from the selector device the selected attributes and the selected data entries, wherein the selected attributes and the selected data entries correspond to two different data types;

performing a zero-knowledge proof with the selector device with respect to the obtained selected attributes and the obtained selected data entries to ascertain that the obtained selected values and the obtained selected data entries belong to a record of an issuer device corresponding to the issuer public key, wherein the selector device proves knowledge of:

a secret record identifier;

a digital signature on a message comprising at least the selected attributes and the secret record identifier, signed with a private key corresponding to the issuer public key;

digital signatures on messages comprising the selected data entries and each comprising the secret record identifier, signed with a private key corresponding to the issuer public key.

13. A non-transitory computer readable storage medium comprising instructions to cause a processor system to perform the method according to claim 12.

* * * * *